United States Patent
Hall

(10) Patent No.: US 12,198,723 B2
(45) Date of Patent: Jan. 14, 2025

(54) SHINGLED MAGNETIC RECORDING HARD DISK DRIVE MEDIA CACHE COPY TRANSFER

(71) Applicant: KABUSHIKI KAISHA TOSHIBA, Tokyo (JP)

(72) Inventor: Andre C. Hall, Fremont, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 16/735,304

(22) Filed: Jan. 6, 2020

(65) Prior Publication Data

US 2020/0251142 A1    Aug. 6, 2020

Related U.S. Application Data

(63) Continuation of application No. 15/452,507, filed on Mar. 7, 2017, now Pat. No. 10,529,374.

(51) Int. Cl.

| G11B 20/12 | (2006.01) |
|---|---|
| G06F 3/06 | (2006.01) |
| G11B 5/02 | (2006.01) |
| G11B 20/10 | (2006.01) |

(52) U.S. Cl.
CPC ........ G11B 20/1217 (2013.01); G06F 3/0611 (2013.01); G06F 3/0656 (2013.01); G06F 3/0676 (2013.01); G11B 5/02 (2013.01); G11B 20/10527 (2013.01); *G11B 2020/1062* (2013.01)

(58) Field of Classification Search
None
See application file for complete search history.

(56) References Cited

U.S. PATENT DOCUMENTS

| 7,788,460 | B2 | 8/2010 | Rothman et al. |
| 9,129,627 | B1 | 9/2015 | Liu et al. |
| 9,530,436 | B1 * | 12/2016 | Masiewicz ............... G11B 5/02 |
| 2013/0246703 | A1 | 9/2013 | Bandic et al. |
| 2014/0254042 | A1 | 9/2014 | Yeo et al. |
| 2015/0109700 | A1 | 4/2015 | Kashiwase et al. |

(Continued)

OTHER PUBLICATIONS

Gibson, G., & Ganger, G. (2011). Principles of Operation for Shingled Disk Devices. (Year: 2011).*

*Primary Examiner* — Eric J Yoon
*Assistant Examiner* — Marwan Ayash
(74) *Attorney, Agent, or Firm* — Kim & Stewart LLP

(57) ABSTRACT

A shingled magnetic recording (SMR) hard disk drive (HDD) receives a read command for data associated with a range of logical block addresses (LBAs). In situations where a first portion of valid data associated with the range of LBAs is stored in an SMR region of the HDD and a second portion of valid data associated with the range of LBAs is stored in a non-SMR region of the HDD, the first portion is read from the SMR region in a single disk access and copied to a first buffer of the HDD, and the second portion is read from the non-SMR region in one or more disk accesses and copied to a second buffer of the HDD. The valid data associated with the range of LBAs stored in the second buffer are copied to the first buffer to be combined with valid data associated with the range of LBAs stored in the first buffer, and the combined valid data is then transferred to the host to complete execution of the read command.

19 Claims, 12 Drawing Sheets

(56) References Cited

U.S. PATENT DOCUMENTS

2016/0085681 A1* 3/2016 Aya .................... G06F 12/0804
  711/103
2017/0083246 A1   3/2017 Liu et al.
2019/0042405 A1* 2/2019 Boyle ................ G06F 12/0246

* cited by examiner

SHINGLED MAGNETIC RECORDING HARD DISK DRIVE MEDIA CACHE COPY TRANSFER

CROSS-REFERENCE TO RELATED APPLICATIONS

This application is a continuation of U.S. patent application Ser. No. 15/452,507, filed Mar. 7, 2017, the entire contents of which are incorporated herein by reference.

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has been continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written (one group at a time) so as to overlap, and therefore overwrite, a portion of the previously written data track. As a result, the data tracks written in an SMR HDD are compressed in width to allow for increased data density in an HDD.

However, SMR HDDs have a significant drawback. Once a data track is written in a shingled structure, that data track cannot be updated in place because that would overwrite and destroy data in one or more adjacent and overlapping data tracks. That is, random block overwrites cannot be performed on shingled data tracks without disturbing existing data. To avoid re-writing an entire group of shingled data tracks each time a host requests an overwrite of data within that group of tracks, data associated with write requests are commonly stored in a so-called "media cache." Typically, the media cache is located in a non-SMR region of the HDD, thereby allowing random block writes to the HDD. Such data stored in the media cache can be later written into the appropriate SMR region of the HDD along with other write data associated with that SMR region.

Unfortunately, a read request received by an SMR HDD that includes some data stored in the SMR region and some data stored in the media-cache region of the HDD can result in poor drive performance. For example, multiple portions of a document may be updated by the host, and therefore require writes to multiple data blocks associated with the document in the media cache of the HDD. Consequently, a subsequent read request by the host for the entire document will effectively be translated into multiple random read requests, as the drive repeatedly seeks between the SMR region and the media-cache region of a disk to read the most up-to-date data associated with the requested document.

SUMMARY

One or more embodiments provide systems and methods for executing a read command in a shingled magnetic recording (SMR) hard disk drive (HDD). In some embodiments, an SMR HDD receives a read command for data associated with a range of logical block addresses (LBAs), where a first portion of valid data associated with the range of LBAs is stored in a shingled magnetic recording (SMR) region of the HDD, and a second portion of valid data associated with the range of LBAs is stored in a non-SMR region of the HDD, e.g., the media cache region. That is, valid data associated with the range of LBAs in the read command include at least one user area data fragment, which is stored in the SMR region, and at least one cached data fragment, which is stored in the non-SMR region. The at least one user area data fragment is read from the SMR region in a single disk access and copied to a first buffer of the HDD, and the at least one cached data fragment is read from the non-SMR region in one or more disk accesses and copied to a second buffer of the HDD. The valid data associated with the range of LBAs stored in the second buffer are copied to the first buffer to be combined with valid data associated with the range of LBAs stored in the first buffer, and the combined valid data is then transferred to the host to complete execution of the read command.

A method of reading data from a magnetic storage device in response to a read command from a host, according to an embodiment, comprises reading data from a shingled magnetic recording (SMR) region of the magnetic storage device into a first buffer, reading data from a non-SMR region of the magnetic storage device into a second buffer, copying data in the second buffer into the first buffer, and transmitting the contents of the first buffer to the host.

A data storage device, according to another embodiment, comprises a rotatable disk with a writable surface, a memory that includes a first buffer and a second buffer, and a controller. The controller is configured to cause data to be read from the writable surface of the magnetic storage device in response to a read command from a host by reading data from a shingled magnetic recording (SMR) region of the writable surface into the first buffer, reading data from a non-SMR region of the writable surface into the second buffer, copying data in the second buffer into the first buffer, and transmitting the contents of the first buffer to the host.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
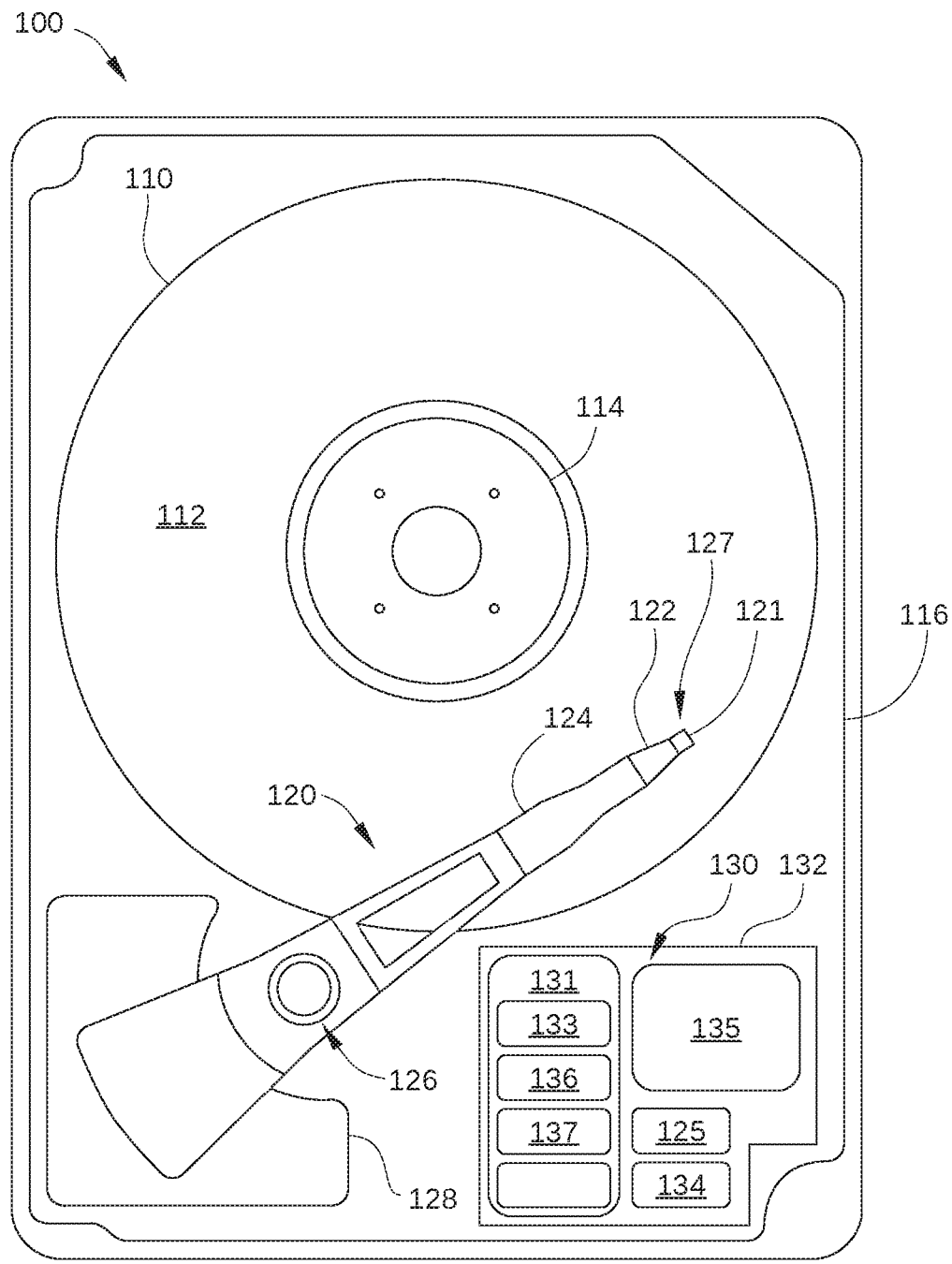
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as one or more data buffers) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system positions read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, i.e., a position error signal (PES). The PES is typically generated by using servo patterns included in the servo wedges (not shown) on the recording surface 112 as a reference. One embodiment of a recording surface 112 is illustrated in FIG. 2.

Figure 2:
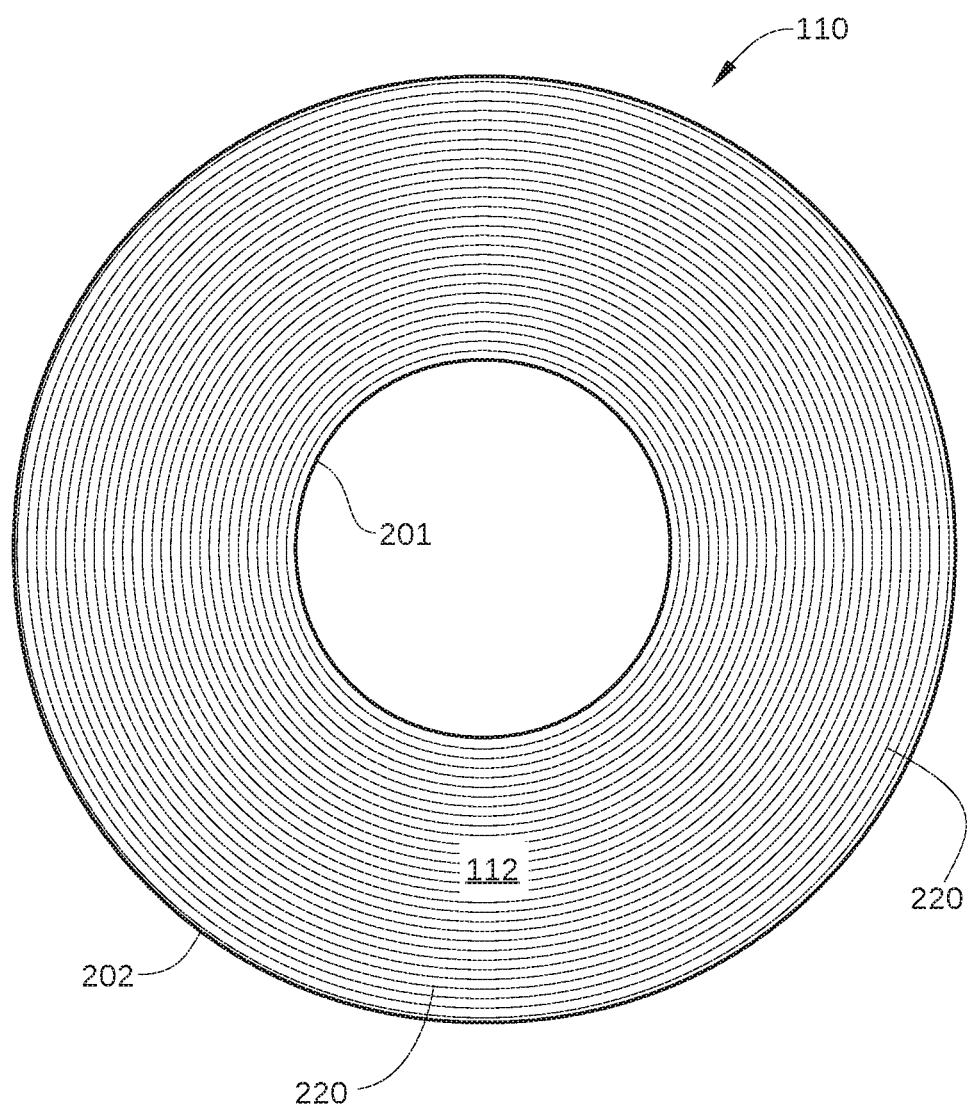
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3.

Figure 3:
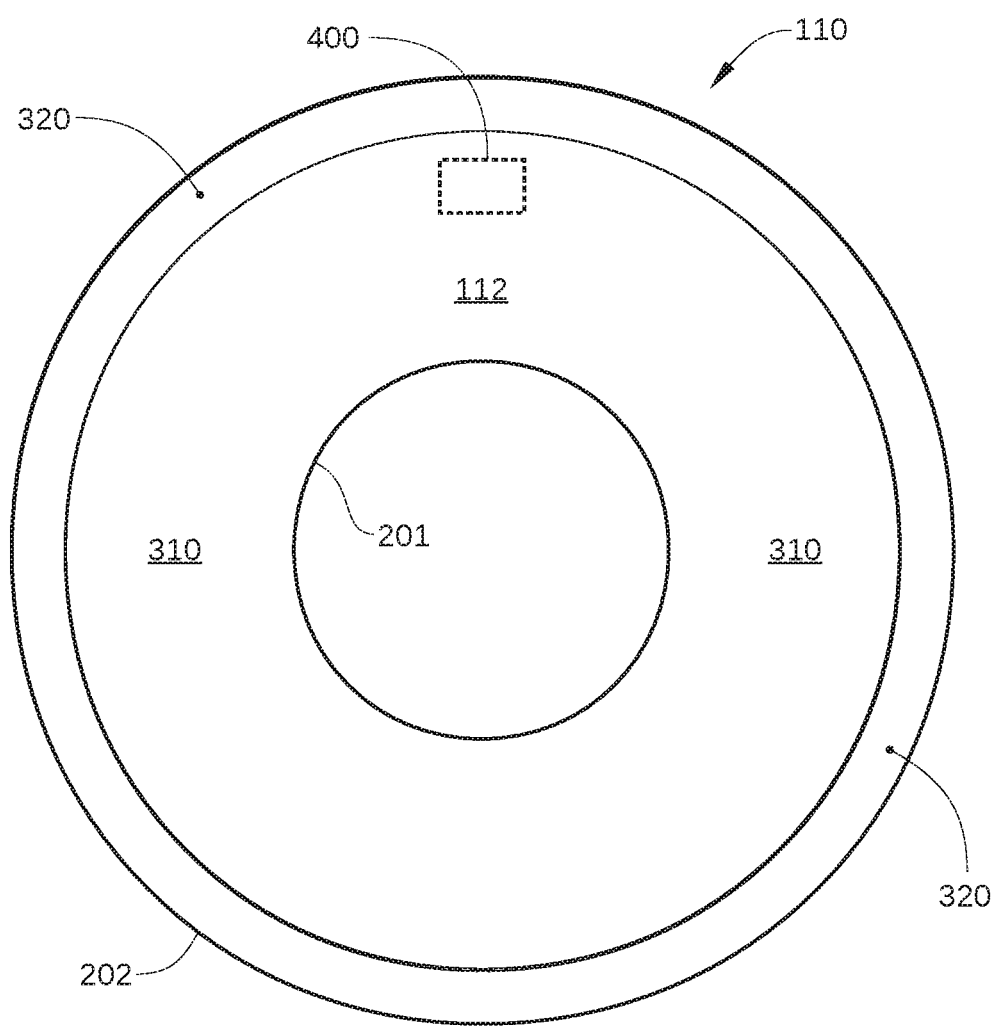
FIG. 3 schematically illustrates a user region of recording surface and a media-cache region of the recording surface, according to an embodiment.

FIG. 3 schematically illustrates a user region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate to OD 202 of recording surface 112 and user region 310 includes the remainder of recording surface 112. In other embodiments, media-cache region 320 may be disposed in any other region of recording surface 112, for example proximate to ID 201, or a middle diameter (MD) region of recording surface 112. Generally, user region 310 includes the majority of the storage capacity of recording surface 112.

User region 310 is a shingled magnetic recording (SMR) region of recording surface 112 that includes data storage tracks 220 that are arranged in groups, or "bands" of data storage tracks. Each band of data storage tracks is separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
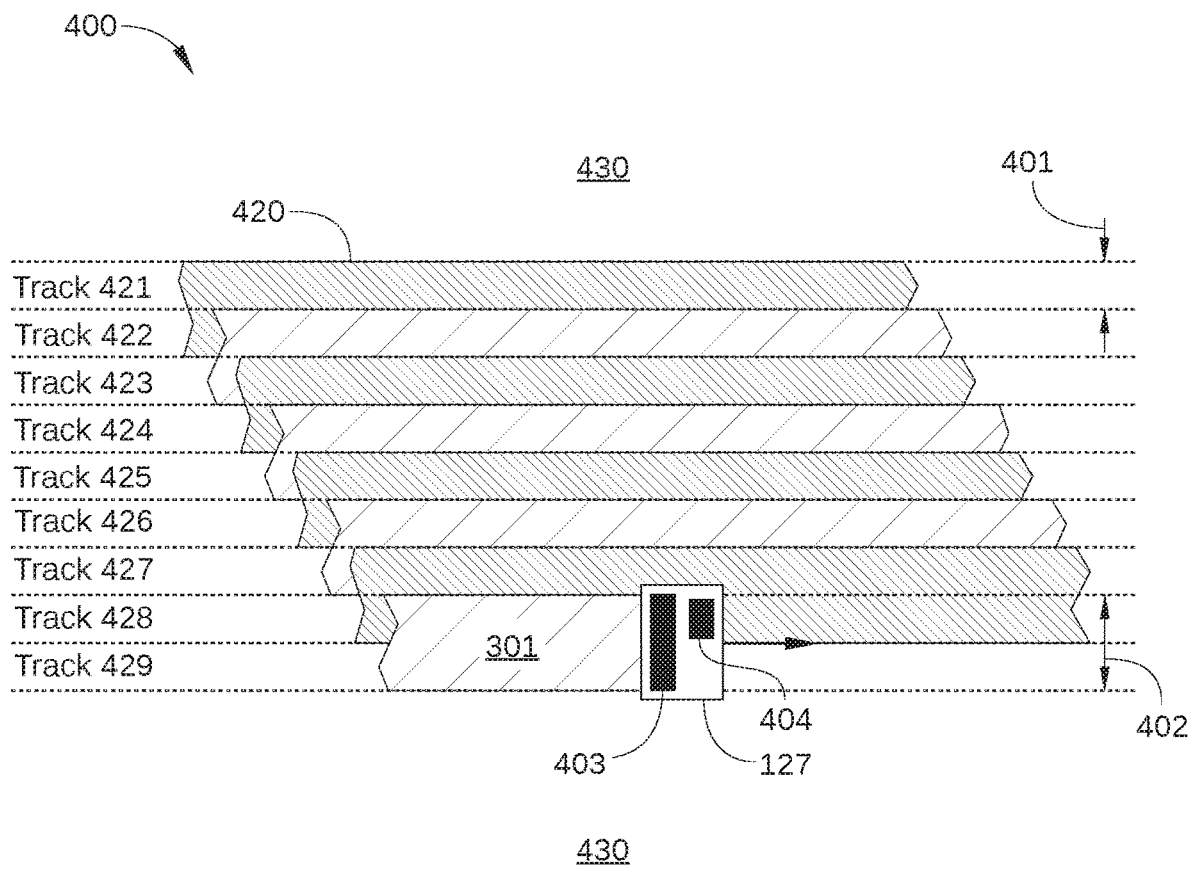
FIG. 4 is a schematic illustration of a portion of a recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are formatted for SMR. As such, read head 404 is configured with a width that is approximately equal to readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of two. Thus, as a particular one of SMR data tracks 421-429 is written, write head 403 is positioned to overlap a significant portion of the preceding SMR data track.

Returning to FIG. 3, media-cache region 320 is configured to store media-cache entries during normal operation of HDD 100. As such, media-cache region 320 includes conventional data storage tracks, i.e., data storage tracks that are not written in an SMR format, and therefore are non-overlapping. Thus, media-cache region 320 can be used to store random block writes without an entire band of shingled tracks being re-written for each write command received. For example, when HDD 100 receives a write command that includes write data and a range of logical block addresses (LBAs) indicated in user region 310 for the storage of the write data, the write data can be written to a physical location in media-cache region 320 rather than to the physical locations of user region 310 that correspond to the LBA range referenced in the write command. The physical location in media-cache region 320 is mapped to the LBAs associated with the write data, so that the write data can be retrieved based on LBAs included in a subsequent read command. In addition, write data stored in media-cache region 320 can be subsequently flushed to an appropriate band in user region 310 at a convenient time. For instance, when it is determined that a particular band in user region 310 stores a quantity of invalid data that exceeds a predetermined threshold quantity, data stored in that particular band can be updated by re-writing the entire band to include the more recent version of any invalid data, i.e., write data that are stored in media-cache region 320 and are mapped to LBAs in that band. In addition, if the media-cache region becomes full (or nearly full), data that is stored only in the media-cache can be flushed to its corresponding location in the user region, to make more room in the media-cache region.

It is noted that a particular document or file stored in HDD 100 is typically associated with a range of LBAs (or with multiple ranges of LBAs) that reference specific physical locations in user region 310. However, in light of the above, when HDD 100 includes SMR regions on disk 110, the most recent data associated with such a document may be fragmented between user region 310 and media-cache region 320. That is, the most up-to-date (i.e., valid) data associated with the document may be stored in a combination of physical locations in user region 310 and in media-cache region 320. Thus, to execute a read command that includes such a fragmented document or file, data are read from multiple locations on a recording surface, thereby slowing the performance of HDD 100 significantly. One such situation is illustrated in FIG. 5.

Figure 5:
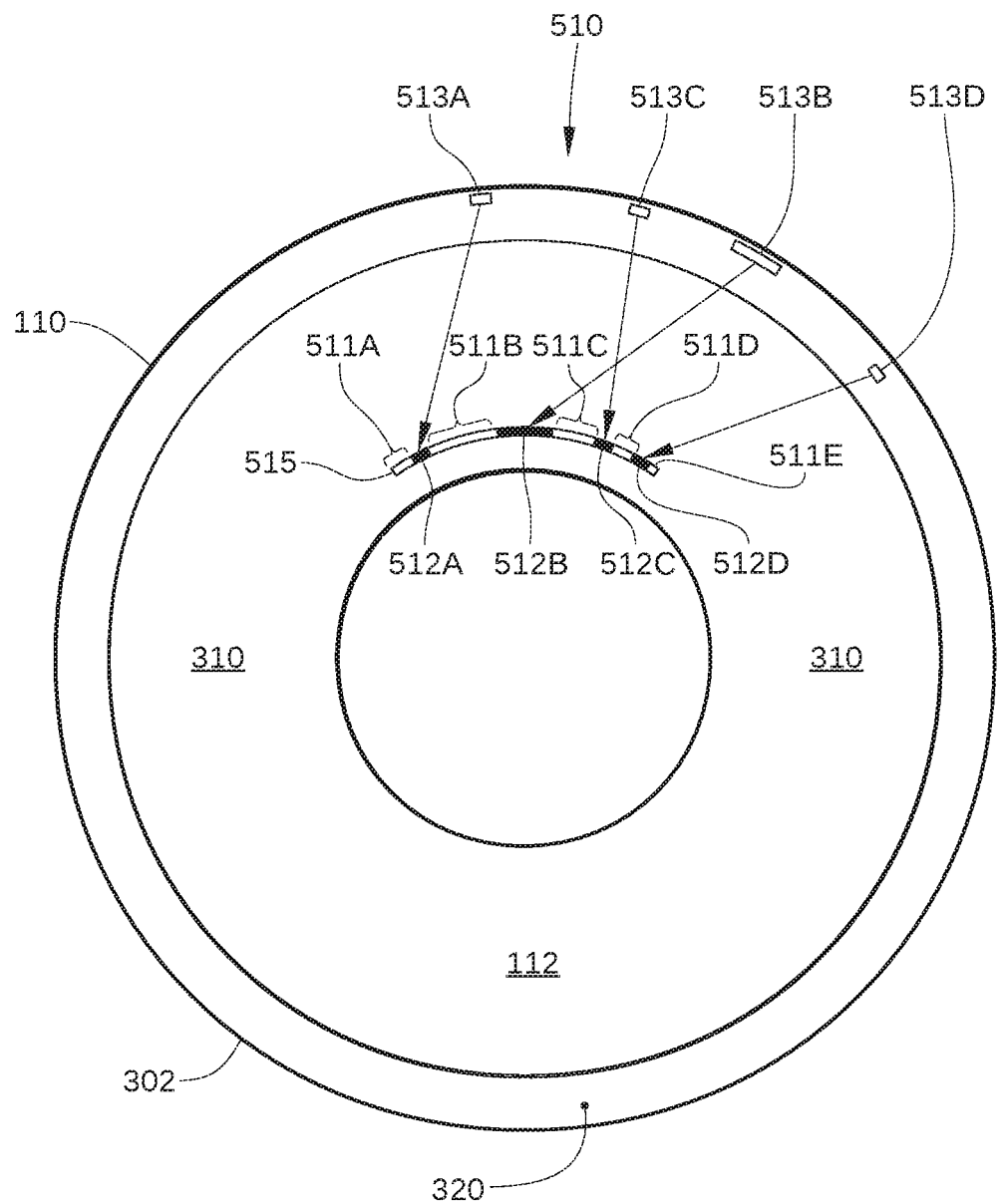
FIG. 5 schematically illustrates data fragments associated with a particular file that is stored on a recording surface, according to an embodiment.

FIG. 5 schematically illustrates data fragments associated with a particular file 510 that is stored on recording surface 112, according to an embodiment. File 510 is a document or file that is originally stored as data in a single group 515 of sequential LBAs associated with physical locations in user region 310. In the embodiment illustrated in FIG. 5, group 515 is illustrated by a portion of a single data storage track of recording surface 112, but in other embodiments, the LBAs of group 515 can span multiple data storage tracks.

As portions of file 510 are updated, the most up-to-date data for file 510 includes data fragments stored in media-cache region 320 and data fragments stored in user region 310. For example, when HDD 100 receives one or more write commands from a host that references one or more LBAs within group 515, the result is that the write data are stored in media-cache region 320 rather than in the referenced LBAs within group 515. Specifically, the most up-to-date data for file 510 includes valid user-region fragments 511A-E, which are stored in physical locations in user region 310, and media- cache fragments 513A-D, which are stored in physical locations in media-cache region 320. It is noted that for each additional portion of file 510 that is updated over time by a host, an additional media-cache fragment 513 is stored at a convenient location in media-cache region 320. Thus, media-cache fragments 513 associated with file 510 are not necessarily adjacent or even proximate to each other, and are instead typically scattered through media-cache region 320.

Additional data fragments associated with file 510 include invalid user-area fragments 512A-D, which store invalid data in physical locations that correspond to LBAs that have been logically overwritten with data that are currently included in media-cache fragments 513A-D. The data of invalid user-area fragments 512A-D are invalid because the physical locations storing invalid user-area fragments 512A-D are not overwritten with valid data (from media-cache fragments 513A-D) until the entire band storing file 510 is overwritten, as described below.

In the embodiment illustrated in FIG. 5, invalid user-area fragment 512A includes data that are logically invalid, but are still stored in the physical locations (sectors) associated with LBAs included in group 515. By contrast, media-cache fragment 513A includes data that are valid and are associated with the LBAs of invalid user-area fragment 512A. A similar relationship exists between invalid user-area fragment 512B and media-cache fragment 513B, between invalid user-area fragment 512C and media-cache fragment 513C, and between invalid user-area fragment 512D and media-cache fragment 513D.

In light of the above-described distribution of data for file 510 between user region 310 and media-cache region 320, execution of a read command that requests the data associated with file 510 involves a plurality of disk accesses. Specifically, execution of such a read command involves the reading of valid user-area fragment 511A, media-cache fragment 513A, valid user-area fragment 511B, media-cache fragment 513B, valid user-area fragment 511C, media-cache fragment 513C, valid user-area fragment 511D, media-cache fragment 513D, and valid user-area fragment 511E. Thus, a disk access is executed for each fragment that includes data requested in the read command, in this case nine. Because seeking to a specific data storage track is generally a time-consuming operation, for example taking on the order of 10 milliseconds or more, the above-described plurality of seeks between user region 310 and media-cache region 320 for a single read command results in significant latency when compared to simply reading data from the physical locations associated with group 515.

According to embodiments of the invention, a read command is executed in an SMR HDD, such as HDD 100, with fewer disk accesses and reduced latency over a conventional SMR HDD. In such embodiments, HDD 100 receives a read command that references LBAs of HDD 100 associated with data stored in both user region 310 and media-cache region 320. Thus, the read command is a request for at least one valid user-area fragment, such as one or more of valid user-area fragments 511A-E, and at least one media-cache fragment, such as one or more of media-cache fragments 513A-D. The at least one valid user-area fragment is read from user region 310 in a single disk access and copied to a first buffer in RAM 134 (shown in FIG. 1), while the at least one media-cache fragment is read from media-cache region 320 in one or more disk accesses and also copied to a second buffer in RAM 134. The data of the at least one media-cache fragment that is stored in the second data buffer are copied to the first buffer, and the data stored in the first buffer are then transferred to the host to complete execution of the read command. One such embodiment is described below in conjunction with FIG. 6.

Figure 6:
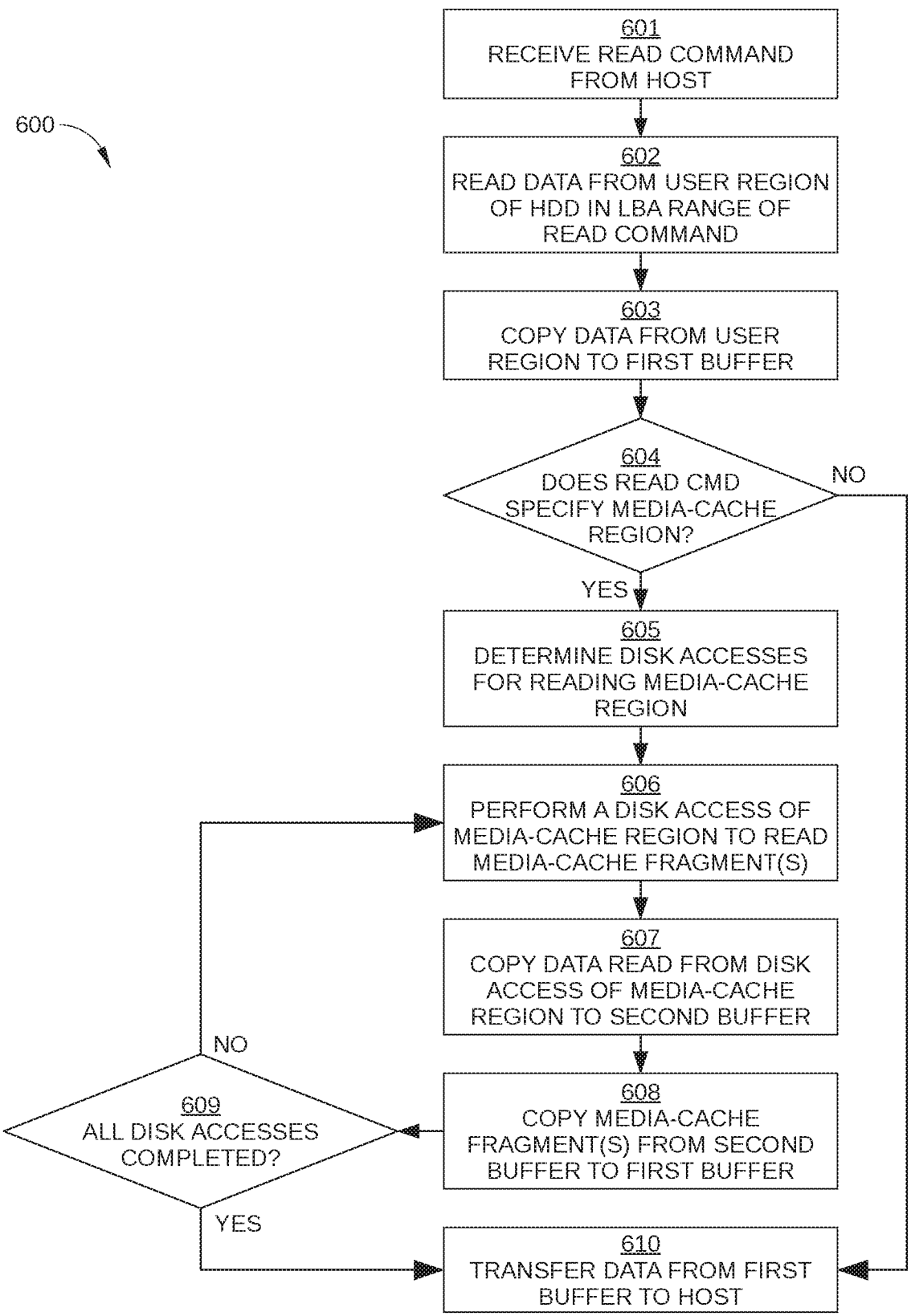
FIG. 6 sets forth a flowchart of method steps for efficiently executing a read command in an SMR HDD that includes a media-cache region, according to an embodiment.

FIG. 6 sets forth a flowchart of method steps for efficiently executing a read command in an SMR HDD that includes a media-cache region, according to an embodiment. FIGS. 7A-7G schematically illustrate stages of the process of FIG. 6, according to various embodiments of the disclosure. Although the method steps are described in conjunction with HDD 100 in FIGS. 1-5, persons skilled in the art will understand that the method steps may be performed with other types of systems. The control algorithms for the method steps reside in microprocessor-based controller 133 in whole or in part as software- or firmware-implemented logic, and/or as hardware-implemented logic circuits.

As shown, a method 600 begins at step 601, when microprocessor-based controller 133 receives a read command 701 from a host 702 external to HDD 100. The read command generally includes a range of LBAs 703 from which host 702 is requesting data to be read, where the LBAs 703 correspond to physical locations in user region 310 of a recording surface 112. The corresponding physical locations may be sectors disposed in data storage tracks that are formed on recording surface 112 in an SMR format. For example, in an embodiment in which read command 701 is for file 510 of FIG. 5, the corresponding physical locations are the sectors that correspond to group 515 of sequential LBAs.

Figure 7A:
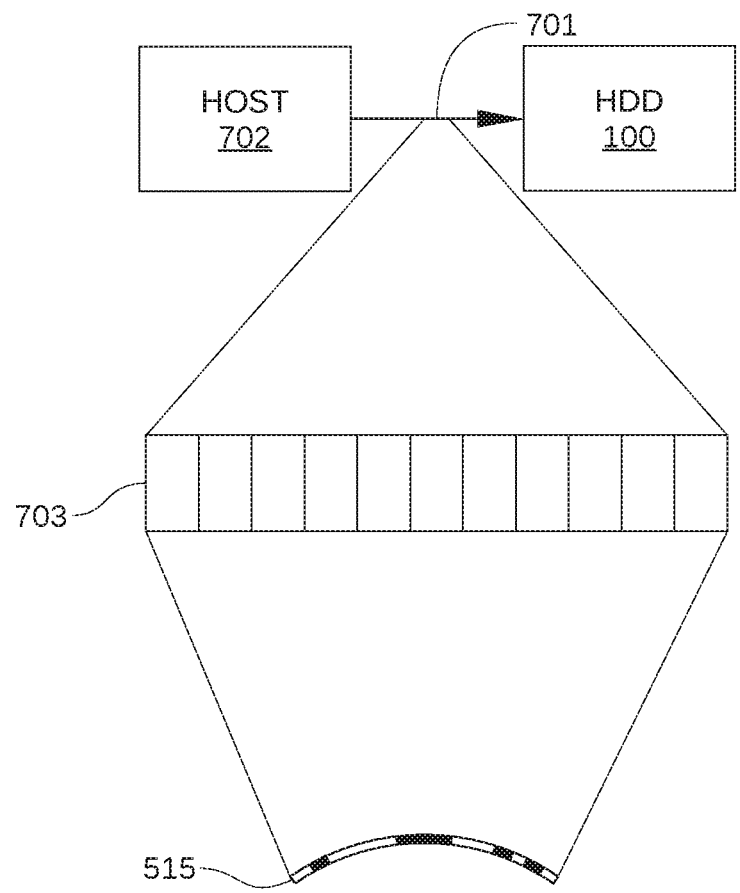
FIGS. 7A-7G schematically illustrate stages of the process of FIG. 6, according to various embodiments.
Figure 7B:
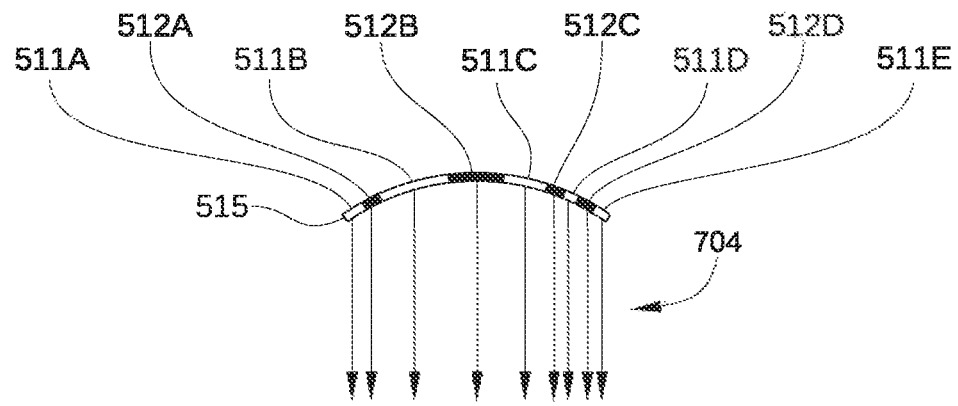

In step 602, microprocessor-based controller 133 causes data to be read from physical locations in user region 310 that correspond to the range of LBAs included in the read command received in step 601, as illustrated in FIG. 7B. In the embodiment illustrated in FIG. 7B, host 702 requests data for file 510, and the read command received in step 601 references the LBAs corresponding to group 515. Thus, the data 704 read from physical locations in step 602 include valid user-region fragments 511A-E and invalid user-region fragments 512A-D. Because group 515 is a sequential group of LBAs that correspond to a physically contiguous group of sectors in user region 310, valid user-region fragments 511A-E and invalid user-region fragments 512A-D are typically read in a single disk access.

Figure 7C:
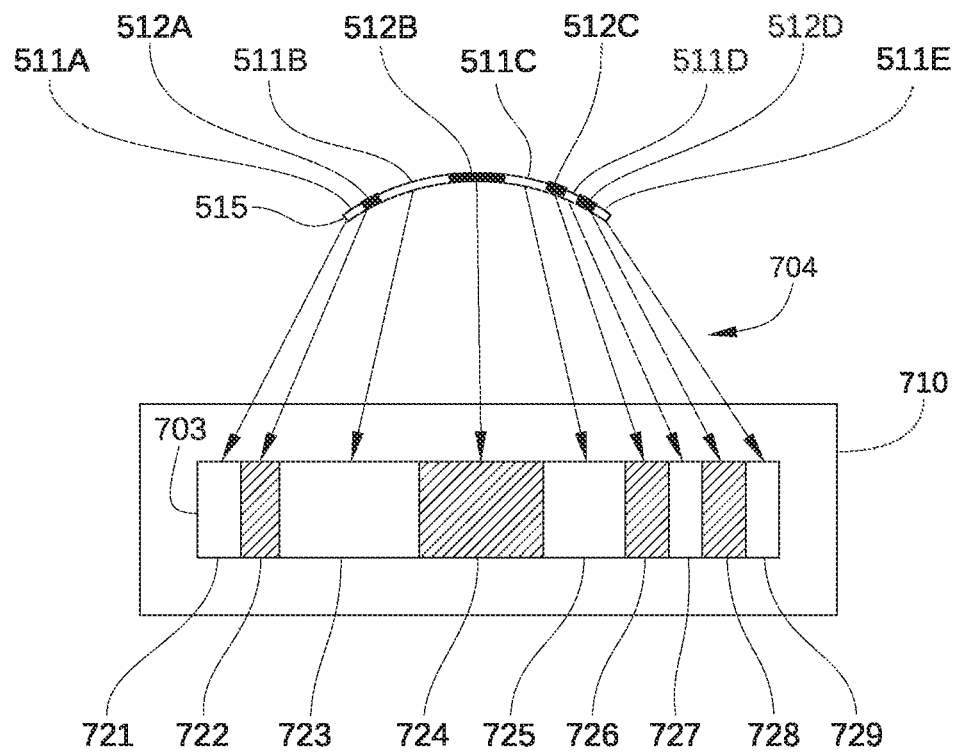

In step 603, microprocessor-based controller 133 stores the data read from user region 310 in step 602 to a transfer block 710 associated with HDD 100, as illustrated in FIG. 7C. Thus, the data read from user region 310 in step 602 can be read directly into transfer block 710. Transfer block 710 may be a memory buffer disposed in any solid-state memory device associated with HDD 100, such as RAM 134. As shown, transfer block 710 includes a plurality of physical locations 721-729 within RAM 134 that are configured to store valid user-region fragments 511A-E and invalid user-region fragments 512A-D. In the embodiment illustrated in FIG. 7C, physical locations 721, 723, 725, 727, and 729 respectively store valid user-region fragments 511A-E, and physical locations 722, 724, 726, and 728 respectively store invalid user-region fragments 512A-D. As shown, valid user-region fragments 511A-E and invalid user-region fragments 512A-D, which are read in step 602 from group 515, are stored in physical locations 721-729.

Transfer block 710 represents a logically contiguous storage region in RAM 134 configured to store data for transfer to a host as part of the execution of the read command received in step 601. Thus, while transfer block 710 graphically represents a plurality of physical storage locations within RAM 134 (i.e., physical locations 721-729), these physical locations can be selected from any available storage resources within RAM 134, and are not necessarily physically contiguous locations within RAM 134. Furthermore, while transfer block 710 is described above as a portion of RAM 134, in some embodiments, transfer block 710 may be disposed within any solid-state memory device associated with HDD 100, such as a portion of a solid-state storage region included in microprocessor-based controller 133, system-on-chip 131, or flash memory device 135.

In step 604, microprocessor-based controller 133 determines whether any LBAs included in the range of LBAs of the read command are mapped to the media-cache region 320. That is, microprocessor-based controller 133 determines if the read command received in step 601 specifies any LBAs for which cached data are stored in media-cache region 320. If no, method 600 proceeds to step 610; if yes, method 600 proceeds to step 605.

In step 605, microprocessor-based controller 133 determines disk accesses to media-cache region 320 for reading media-cache fragments 513A-D, collectively referred to herein as media-cache fragments 513. Media-cache fragments 513 include the most recent data, i.e., the valid data, for certain LBAs associated with file 510. As is well-known in the art, a disk access is a particular read operation performed on one of recording surfaces 112 in HDD 100. Thus, a single disk access generally includes a seek operation of read/write head 127 to a targeted data storage track 220, servoing of read/write head 127 on the targeted data storage track 220, and reading of data in targeted sectors of the targeted data storage track 220.

Depending on the relative locations within media-cache region 320 of media-cache fragments 513, microprocessor-based controller 133 may determine that a single disk access or multiple disk accesses of media-cache region 320 are to be employed to read all media-cache fragments 513. Any suitable algorithm may be employed to determine which media-cache fragments 513 are to be read in a particular disk access. In particular, any two or more of media-cache fragments 513 may be determined to be read in a single disk access based on any suitable criteria, such as radial and or circumferential proximity to one or more other media-cache fragments 513. For example, in some embodiments, a single disk access in media-cache region 320 can be employed to read multiple media-cache fragments 513 that are disposed within a certain number of sectors of each other, thereby reducing the number of disk accesses required to execute the read command received in step 601.

In some embodiments, when two media-cache fragments 513 are stored within a predetermined number of physical locations of each other in media-cache region 320, the two media-cache fragments 513 are read in a single disk access.

As a result, the number of disk accesses to media-cache region 320 for reading media-cache fragments 513 is generally less than the total number of media-cache fragments 513 associated with the read command received in step 601, and may be a low as one. For example, in one such embodiment, the predetermined number of physical locations is 3072 4 KB sectors of media-cache region 320. Therefore, in this embodiment, any two media-cache fragments 513 (i.e., 513A, 513B, 513C, or 513D) that are disposed within 3072 4 KB sectors of another of media-cache fragment 513 are read in a single disk access. Thus, if each of media-cache fragments 513A, 513B, 513C, and 513D is separated from another of these media-cache fragments 513 by 3072 or fewer sectors, microprocessor-based controller 133 determines that all four of these media-cache fragments 513 are read during a single disk access. It is noted that in such a situation, a small quantity write data included in media cache fragments 513A, 513B, 513C, and 513D can potentially result in a large quantity of data being read and stored in a single disk access. Thus, in some embodiments, microprocessor-based controller 133 may include hardware or other logic for flow control of such data (referred below as data 705 in FIG. 7E), wrapping of such data in a media-cache read block 720 (described below in conjunction with FIG. 7F), and copying of a portion of the data associated with media- cache fragments 513A, 513B, 513C, and 513D to a transfer block 710 (shown in FIG. 7F) before all data associated with media-cache fragments 513A, 513B, 513C, and 513D has been read from media-cache region 320.

It is noted that performing a single disk access that includes two or more entire revolutions of a storage disk 110 can result in greater latency than performing a first disk access to a first data storage track and a second disk access to a second data storage track that is located relatively close to the first data storage track. Thus, in some embodiments, the predetermined number of physical locations separating two media-cache fragments 513 that are read in a single disk access is a number based on how many physical locations or sectors are in a single data storage track 220 in media-cache region 320. In such embodiments, the predetermined number may be equal to or greater than the approximate number of physical sectors in a single data storage track 220 in media-cache region 320. For example, when a data storage track 220 in media-cache region 320 includes approximately 3000 sectors, the predetermined number may be selected to be greater than or equal to 3000 sectors (i.e., one complete revolution), but less than about 6000 sectors (i.e., two complete revolutions). Therefore, if two media-cache fragments 513 are separated by 3000 or more sectors, each of the media-cache fragments 513 can be assumed to be stored in two different data storage tracks 220. Consequently, reading each of these two media-cache fragments 513 with a different disk access is unlikely to increase latency compared to reading both media-cache fragments 513 with a single disk access spanning two or more data storage tracks 220.

Figure 7D:
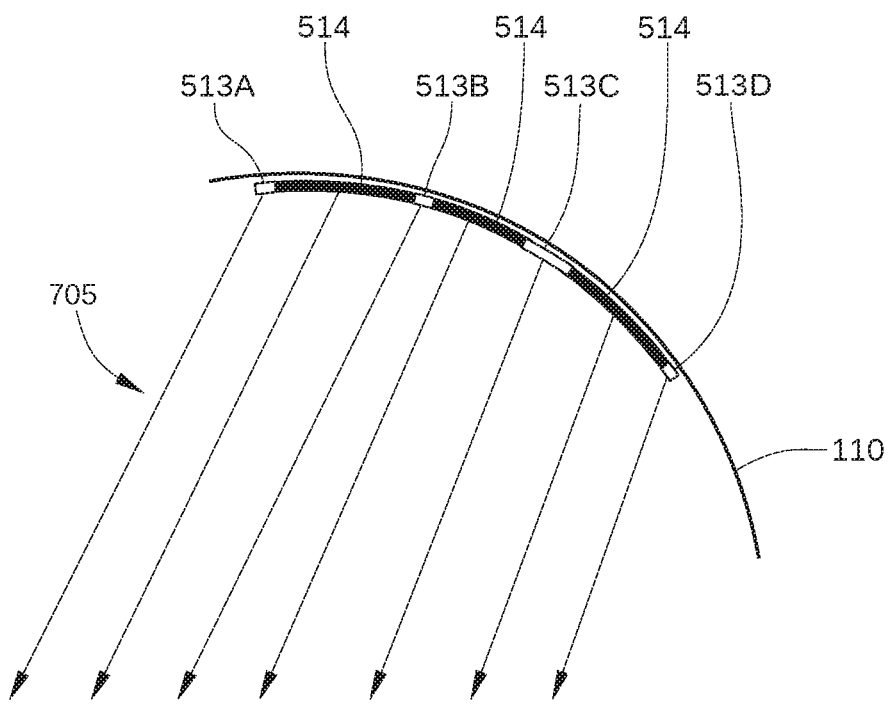

In step 606, microprocessor-based controller 133 causes data 705 that are associated with the read command and stored in media-cache region 320 to be read by performing a disk access to media-cache region 320, as shown in FIG. 7D. For example, in the embodiment illustrated in FIG. 7D, microprocessor-based controller 133 causes media-cache fragments 513A-D to be read from media-cache region 320. As described above in step 605, a single media-cache fragment 513 or multiple media-cache fragments 513 may be read in one disk access to media-cache region 320, depending on the separation in physical sectors between the various media-cache fragments 513 associated with the read command. In the embodiment illustrated in FIG. 7D, all of media-cache fragments 513A-D are read in a single disk access.

In some embodiments, data 705, which are read with one or more disk accesses to media-cache region 320, include other data not associated with the read command received in step 601. In such embodiments data 705 include other media-cache data 514 read during the single disk access in which multiple media-cache fragments 513 are read. Specifically, other media-cache data 514 include data that are stored in sectors that are between two of media-cache fragments 513 that are read in a single disk access. Thus, other media-cache data 514 are data that are not associated in any way with the read command received in step 601, but are read during the same disk access that reads two or more media-cache fragments 513. It is noted that other media-cache data 514 are read during this single disk access even though such data are not associated with the read command received in step 601 and are subsequently discarded.

Figure 7E:
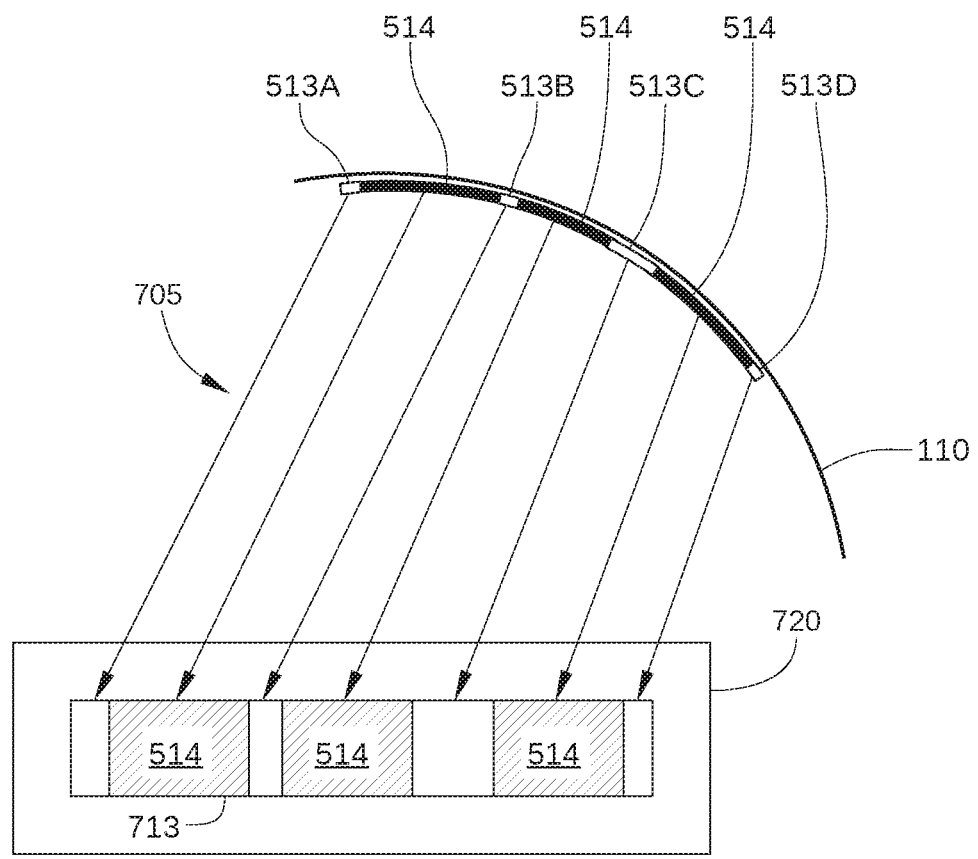

In step 607, microprocessor-based controller 133 stores data read from media-cache region 320 in step 606 to a media-cache read block 720 associated with HDD 100, as illustrated in FIG. 7E. Thus, in the embodiment illustrated in FIG. 7E, the data are read from media-cache region 320 in step 606 directly into media-cache read block 720. These data are media-cache fragments 513A-D and other media-cache data 514. Media-cache read block 720 is located in buffer memory of HDD 100, and as such is a memory buffer that represents a logically contiguous storage region in RAM 134 configured to store data read from media-cache region 320 as part of the execution of the read command received in step 601. Thus, while media-cache read block 720 graphically represents a plurality of physical storage locations 713 within RAM 134, these physical locations can be selected from any available storage resources within RAM 134, and are not necessarily physically contiguous locations within RAM 134. Furthermore, while media-cache read block 720 is described above as a portion of RAM 134, in some embodiments, media-cache read block 720 may be disposed within any solid-state memory device associated with HDD 100, such as a portion of a solid-state storage region included in microprocessor-based controller 133, system-on-chip 131, or flash memory device 135.

Figure 7F:
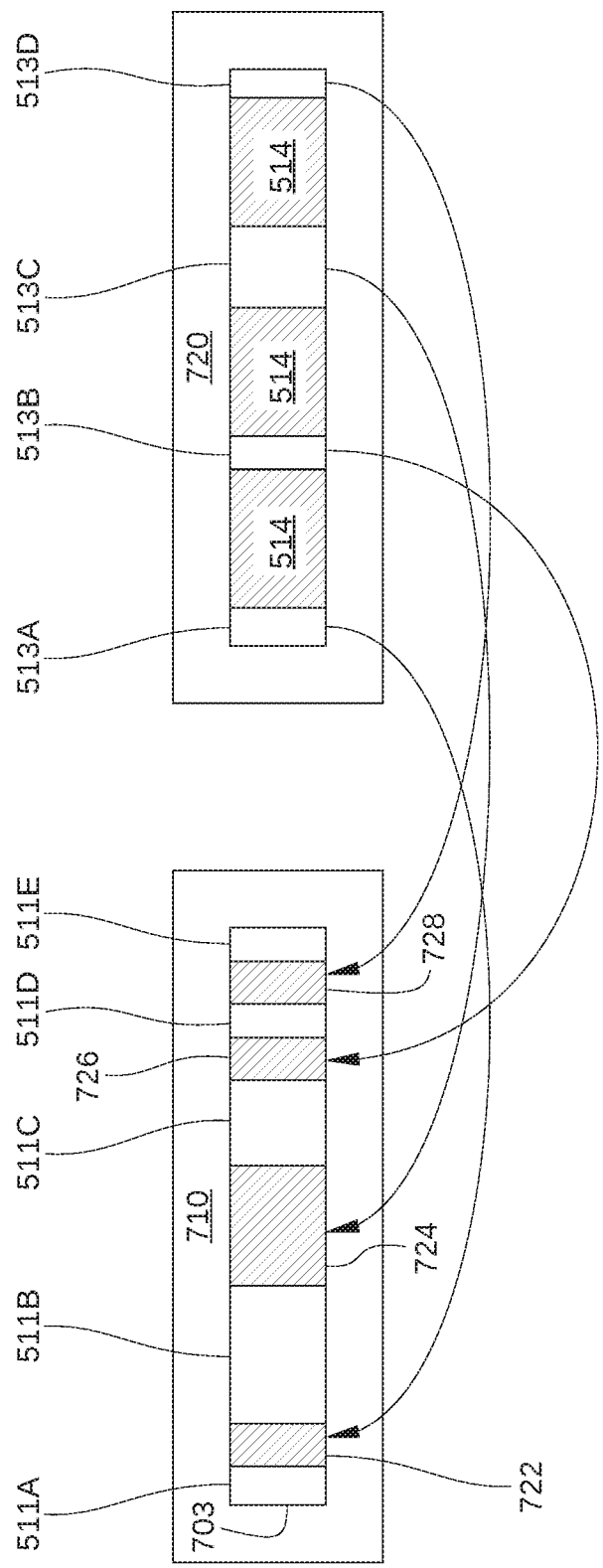
Figure 7G:
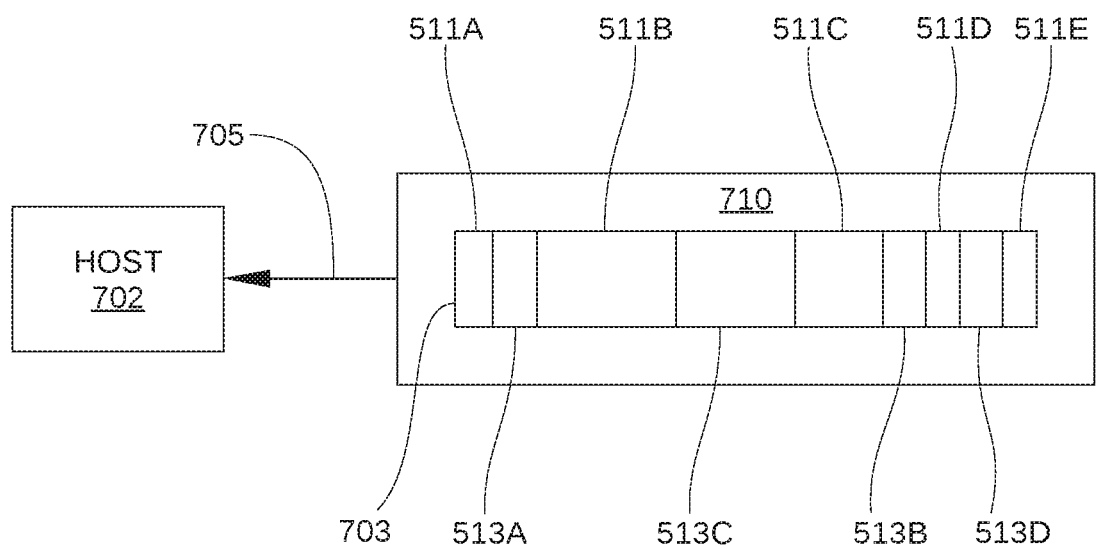

In step 608, microprocessor-based controller 133 copies certain data read from media-cache read block 720 to transfer block 710, as illustrated in FIG. 7F. In particular, the data copied to transfer block 710 in step 608 are media-cache fragments 513A-D. Further, each of media-cache fragments 513 is copied into specific physical locations in transfer block 710 to overwrite corresponding invalid user-area fragments 512A-D. Thus, in the embodiment illustrated in FIG. 7F, media-cache fragment 513A is written to physical location 722 to overwrite invalid user-area fragment 512A, media-cache fragment 513B is written to physical location 726 to overwrite invalid user-area fragment 512C, media-cache fragment 513C is written to physical location 724 to overwrite invalid user-area fragment 512B, and media-cache fragment 513D is written to physical location 728 to overwrite invalid user-area fragment 512D. It is noted that the data of media-cache fragments 513A-D are the most recently updated version of data associated with the LBAs storing invalid user-area fragments 512A, 512C, 512B, and 512D, respectively. Thus, the logically invalid data of invalid user-area fragments 512A, 512B, 512C, and 512D are overwritten with the valid data of media-cache fragments 513A, 513C, 513B, and 513D, respectively.

In step 609, microprocessor-based controller 133 determines whether all disk accesses to media-cache region 320 for reading media-cache fragments 513 have been completed. If no, method 600 proceeds back to step 606, and another disk access is performed; if yes, method 600 proceeds to step 610. Thus, once all disk accesses are completed for reading media-cache fragments 513, method 600 proceeds to step 610.

In step 610, microprocessor-based controller 133 transfers data stored in transfer block 710 to host 702 via a response 705, thereby completing execution of the read command received in step 601.

In some embodiments, method 600 is modified to further reduce latency in executing a read command from a host. In such embodiments, the copying of media-cache fragments 513 to transfer block 710 from media-cache read block 720 is not performed for all of media-cache fragments 513 after completion of step 607. Instead, when a media-cache fragment 513 is copied to media-cache read block 720 and is determined to be a media-cache fragment and not other media-cache data 514, that media-cache fragment 513 is immediately copied to the corresponding physical location in transfer block 710. Thus, media-cache fragments 513 are individually copied to an appropriate physical location in transfer block 710, as described above in step 607, while the disk access to media-cache region 320 is still underway. For example, referring to FIGS. 7E and 7F, once media-cache fragment 513A is read and copied to media-cache read block 720, media-cache fragment 513A is copied to physical location 722 before media-cache fragment 513B is read from media-cache region 320. As a result, the transfer of data stored in transfer block 710 to host 702 in step 610 can begin sooner than an embodiment in which step 610 occurs only after all of media-cache fragments 513 are transferred to media-cache read block 720 in a single operation in step 609.

In alternative embodiments of method 600, step 608 is not performed, and certain data read from media-cache read block 720 are not transferred to transfer block 710. In such embodiments, microprocessor-based controller 133 performs a modified step 610. Specifically, microprocessor-based controller 133 sends data stored in the appropriate portions of transfer block 710 and media-cache read block 720 to host 702. In one example of such embodiments, microprocessor-based controller 133 includes linked-list hardware for performing such a modified step 610.

In sum, the implementation of method 600 enables executing of a read command in an SMR HDD with fewer disk accesses and reduced latency over a conventional SMR HDD. Because a single disk access is employed to read data from user region 310, and media-cache region 320 is accessed with a reduced number of disk accesses, the read command is executed with minimal latency, even when a read command references a range of LBAs that is highly fragmented between user region 310 and media-cache region 320.

While the foregoing is directed to embodiments of the present invention, other and further embodiments of the invention may be devised without departing from the basic scope thereof, and the scope thereof is determined by the claims that follow.

I claim:

1. A method of reading data in a magnetic storage device that comprises a magnetic storage medium and a memory device separate from the magnetic storage medium, wherein the magnetic storage medium includes a shingled magnetic recording (SMR) region and a non-SMR region, and the memory device includes a first buffer and a second buffer, the method comprising:
in response to a read command from a host, wherein the read command specifies a range of logical block addresses (LBAs), transmitting fragments of valid user data directly from the first buffer to the host and fragments of updated user data directly from the second buffer to the host, wherein the method further comprises performing the following steps before transmitting the valid user data and the updated user data to the host:
(a) reading first data from physical locations in the SMR region of the magnetic storage medium, that correspond to the range of LBAs specified in the read command, into the first buffer, the first data including the fragments of valid user data and including fragments of invalid user data;
(b) determining whether or not at least one LBA in the range of LBAs specified in the read command, is mapped to physical locations in the non-SMR region of the magnetic storage medium; and
(c) upon determining that the at least one LBA in the range of LBAs specified in the read command, is mapped to the physical locations in the non-SMR region of the magnetic storage medium, reading second data from the physical locations in the non-SMR region of the magnetic storage medium, into the second buffer, the second data including the fragments of updated user data.

2. The method of claim 1, wherein the first data are read from the SMR region of the magnetic storage medium into the first buffer through a single disk access.

3. The method of claim 1, wherein the second data are read from the non-SMR region of the magnetic storage medium into the second buffer by:
determining a number of separate disk accesses for reading the second data from the non-SMR region of the magnetic storage medium; and
performing the separate disk accesses of the determined number.

4. The method of claim 3, wherein performing the separate disk accesses of the determined number comprises:
performing a first separate disk access to read a first portion of the second data from the non-SMR region of the magnetic storage medium and copying the first portion to the second buffer; and
performing a second separate disk access to read a second portion of the second data from the non-SMR region of the magnetic storage medium and copying the second portion to the second buffer.

5. The method of claim 3, wherein performing one of the separate disk accesses comprises:
reading a first fragment of the updated user data from a first physical location in the non-SMR region of the magnetic storage medium; and
reading a second fragment of the updated user data from a second physical location in the non-SMR region of the magnetic storage medium that is not adjacent to the first physical location in a rotational direction of the magnetic storage medium.

6. The method of claim 5, wherein performing the one of the separate disk accesses further comprises:
reading media-cache data that are stored in physical locations that are between the first physical location and the second physical location in the rotational direction of the magnetic storage medium.

7. The method of claim 6, wherein the media-cache data are not associated with the range of LBAs specified in the read command.

8. The method of claim 5, wherein the first physical location is within a predetermined number of sectors of the second physical location.

9. The method of claim 1, wherein
a first fragment of the updated user data stored in the non-SMR region of the magnetic storage medium and a first fragment of the invalid user data stored in the SMR region of the magnetic storage medium are each associated with a first range of LBAs specified in the read command, and
a second fragment of the updated user data stored in the non-SMR region of the magnetic storage medium and a second fragment of the invalid user data stored in the SMR region of the magnetic storage medium are each associated with a second range of LBAs specified in the read command.

10. A magnetic data storage device comprising:
a magnetic rotatable disk with a writable surface, the magnetic rotatable disk including a shingled magnetic recording (SMR) region and a non-SMR region;
a memory that includes a first buffer and a second buffer, the memory being separate from the magnetic rotatable disk; and
a controller configured to complete the execution of a read command from a host, the read command specifying a range of logical block addresses (LBAs), by transmitting fragments of valid user data directly from the first buffer to the host and fragments of updated user data directly from the second buffer to the host, wherein the controller is further configured to perform the following steps before transmitting the valid user data and the updated user data to the host:
(a) reading first data from physical locations in the SMR region of the magnetic rotatable disk, that correspond to the range of LBAs specified in the read command, into the first buffer, the first data including the fragments of valid user data and including fragments of invalid user data;
(b) determining whether or not at least one LBA in the range of LBAs specified in the read command, is mapped to physical locations in the non-SMR region of the magnetic rotatable disk; and
(c) upon determining that the at least one LBA in the range of LBAs specified in the read command, is mapped to the physical locations in the non-SMR region of the magnetic rotatable disk, reading second data from the physical locations in the non-SMR region of the magnetic rotatable disk, into the second buffer, the second data including the fragments of updated user data.

11. The magnetic data storage device of claim 10, wherein the first data are read from the SMR region of the magnetic rotatable disk into the first buffer through a single disk access.

12. The magnetic data storage device of claim 1, wherein the second data are read from the non-SMR region of the magnetic rotatable disk into the second buffer by:
determining a number of separate disk accesses for reading the second data from the non-SMR region of the magnetic rotatable disk; and
performing the separate disk accesses of the determined number.

13. The magnetic data storage device of claim 12, wherein performing the separate disk accesses of the determined number comprises:
performing a first separate disk access to read a first portion of the second data from the non-SMR region of the magnetic rotatable disk and copying the first portion to the second buffer; and
performing a second separate disk access to read a second portion of the second data from the non-SMR region of the magnetic rotatable disk and copying the second portion to the second buffer.

14. The magnetic data storage device of claim 12, wherein performing one of the separate disk accesses comprises:
reading a first fragment of the updated user data from a first physical location in the non-SMR region of the magnetic rotatable disk; and
reading a second fragment of the updated user data from a second physical location in the non-SMR region of the magnetic rotatable disk that is not adjacent to the first physical location in a rotational direction of the magnetic rotatable disk.

15. The magnetic data storage device of claim 14, wherein performing the one of the separate disk accesses further comprises:
reading media-cache data that are stored in physical locations that are between the first physical location and the second physical location in the rotational direction of the magnetic rotatable disk.

16. The magnetic data storage device of claim 15, wherein the media-cache data are not associated with the range of LBAs specified in the read command.

17. The magnetic data storage device of claim 14, wherein the first physical location is within a predetermined number of sectors of the second physical location.

18. The magnetic data storage device of claim 10, wherein
a first fragment of the updated user data stored in the non-SMR region of the magnetic rotatable disk and a first fragment of the invalid user data stored in the SMR region of the magnetic rotatable disk are each associated with a first range of LBAs specified in the read command, and
a second fragment of the updated user data stored in the non-SMR region of the magnetic rotatable disk and a second fragment of the invalid user data stored in the SMR region of the magnetic rotatable disk are each associated with a second range of LBAs specified in the read command.

19. A magnetic data storage device comprising:
a magnetic rotatable disk with a writable surface, the magnetic rotatable disk including a shingled magnetic recording (SMR) region and a non-SMR region;
a memory that includes a first buffer and a second buffer, the memory being separate from the magnetic rotatable disk; and
a controller configured to, in response to a read command from a host, which specifies a range of logical block addresses (LBAs), transmit fragments of valid user data directly from the first buffer to the host and fragments of updated user data directly from the second buffer to the host, wherein the controller is further configured to perform the following steps before transmitting the valid user data and the updated user data to the host:
(a) reading first data from physical locations in the SMR region of the magnetic rotatable disk, that correspond to the range of LBAs specified in the read command, into the first buffer, the first data including the fragments of valid user data and including fragments of invalid user data;
(b) determining whether or not at least one LBA in the range of LBAs specified in the read command, is mapped to physical locations in the non-SMR region of the magnetic rotatable disk; and
(c) upon determining that the at least one LBA in the range of LBAs specified in the read command, is mapped to the physical locations in the non-SMR region of the magnetic rotatable disk, reading second data from the physical locations in the non-SMR region of the magnetic rotatable disk, into the second buffer, the second data including the fragments of updated user data.

* * * * *